US012725390B2

(12) United States Patent
Seo et al.

(10) Patent No.: US 12,725,390 B2
(45) Date of Patent: Sep. 1, 2026

(54) DEVICE AND METHOD FOR DETECTING RADIOGRAPHIC OBJECT USING EXTREMAL DATA

(71) Applicant: DOOSAN ENERBILITY CO., LTD., Changwon (KR)

(72) Inventors: June Sung Seo, Gimpo (KR); Gung Hul Park, Seoul (KR); Seong Sik Ko, Hwaseong (KR); Jung Min Lee, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 320 days.

(21) Appl. No.: 18/496,798

(22) Filed: Oct. 27, 2023

(65) Prior Publication Data

US 2024/0169683 A1 May 23, 2024

(30) Foreign Application Priority Data

Nov. 22, 2022 (KR) ........................ 10-2022-0157611

(51) Int. Cl.
*G06V 10/25* (2022.01)
*G01N 23/04* (2018.01)
(Continued)

(52) U.S. Cl.
CPC .............. *G06V 10/25* (2022.01); *G06V 10/46* (2022.01); *G06V 20/64* (2022.01); *G06V 2201/07* (2022.01)

(58) Field of Classification Search
USPC .......................................................... 382/100
See application file for complete search history.

(56) References Cited

U.S. PATENT DOCUMENTS 6,055,295 A * 4/2000 Murthy .................... A61B 6/06 378/151
6,327,581 B1 * 12/2001 Platt ....................... G06N 20/00 706/14

(Continued)

FOREIGN PATENT DOCUMENTS

CN 112435198 A 3/2021
CN 114943843 A 8/2022

(Continued)

OTHER PUBLICATIONS

Hun-Gyu Hwang, A Development of Welding Information Management and Defect Inspection Platform based on Artificial Intelligent for Shipbuilding and Maritime Industry, Article, Feb. 2021, Korea.

(Continued)

*Primary Examiner* — Chineyere Wills-Burns
*Assistant Examiner* — Bezawit Nolawi Shimeles
(74) *Attorney, Agent, or Firm* — Harvest IP Law, LLP

(57) ABSTRACT

A method of detecting a radiographic object is proposed. The method includes receiving, by a feature processing module, an input of radiographic image obtained by irradiating a region containing a plurality of tubes including at least one target tube as a radiographic object and at least one untargeted tube that is not a radiographic object, extracting, by the feature processing module, feature values of extremal points from the radiographic image to detect feature vectors, and analyzing, by a detection module, the feature vectors using a training model to detect a region in the radiographic image where the at least one target tube as a radiographic object exists.

8 Claims, 7 Drawing Sheets

(51) Int. Cl.

| | |
|---|---|
| ***G01N 23/18*** | (2018.01) |
| ***G06F 18/2411*** | (2023.01) |
| ***G06N 3/08*** | (2023.01) |
| ***G06V 10/46*** | (2022.01) |
| ***G06V 20/52*** | (2022.01) |
| ***G06V 20/64*** | (2022.01) |

(56) References Cited

U.S. PATENT DOCUMENTS

| | | | | |
|---|---|---|---|---|
| 6,658,089 | B1 | 12/2003 | Mohr | |
| 8,204,291 | B2 * | 6/2012 | Venkatachalam | G06T 7/0004 378/58 |
| 2005/0096515 | A1 * | 5/2005 | Geng | A61N 5/1049 600/315 |
| 2006/0126912 | A1 * | 6/2006 | Belykh | G06T 5/70 382/275 |
| 2007/0203861 | A1 * | 8/2007 | Gates | G06F 18/2411 706/16 |
| 2009/0066939 | A1 * | 3/2009 | Venkatachalam | G01N 23/04 356/237.1 |
| 2011/0106735 | A1 * | 5/2011 | Weston | G06N 20/00 706/12 |
| 2012/0134576 | A1 * | 5/2012 | Sharma | G06V 10/507 382/206 |
| 2015/0206614 | A1 * | 7/2015 | Roh | A61B 6/542 378/62 |
| 2017/0082556 | A1 * | 3/2017 | Bueno | G01T 1/2012 |
| 2020/0051017 | A1 * | 2/2020 | Dujmic | G06V 30/424 |
| 2020/0320326 | A1 * | 10/2020 | Dou | A61B 6/545 |
| 2021/0010953 | A1 * | 1/2021 | Adler | G01T 1/20 |

FOREIGN PATENT DOCUMENTS

| | | | |
|---|---|---|---|
| JP | 2003220055 | A | 8/2003 |
| JP | 2011052968 | A | 3/2011 |
| JP | 2011189082 | A | 9/2011 |
| JP | 2012146108 | A | 8/2012 |
| JP | 2021012108 | A | 2/2021 |
| KR | 1020130067758 | A | 6/2013 |
| KR | 1020180040939 | A | 4/2018 |
| KR | 1020220067933 | A | 5/2022 |

OTHER PUBLICATIONS

Non-Patent Literature Document 1_Automatic Detection of Welding Defects Using Faster R-CNN_English abstract.

Automatic Detection of Objects in Radiographic Images.

Review on Computer Aided Weld Defect Detection from Radiography Images.

Computer Vision on X-ray Data in Industrial Production and Security Application.

An Autunomous Technique for Multi Class Weld Imperfections Detection and Classification by Support Vector Machine.

EP EESR, dated May 13, 2024.

* cited by examiner

Radiographic pickup module (100)

Feature processing module (200)

Training module (300)

Detection module (400)

FIG. 3A
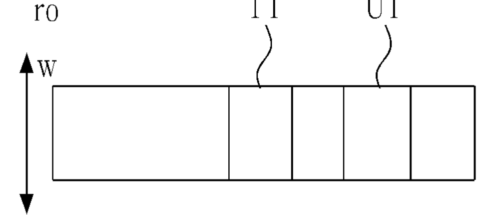
FIG. 3B
FIG. 3C
• Extremal points
1 2 3 4 5 6 7 8 9 10 11 12 13 14 15 16 17 18 19

FIG. 4

| | Description |
|---|---|
| index | Index of row representative feature extrema |
| sign | Sign of extremal point |
| xValue | x-axis position of extremal point |
| amplitude | y-axis position of extremal point |
| leftSign | Sign of extremal point on left side of current extremal point |
| leftXValue | x-axis position of extremal point on left side of current extremal point |
| leftAmplitude | y-axis position of extremal point on left side of current extremal point |
| rightSign | Sign of extremal point on right side of current extremal point |
| rightXValue | x-axis position of extremal point on right side of current extremal point |
| rightAmplitude | y-axis position of extremal point on right side of current extremal point |
| leftRelXValue | difference in x-axis position of extremal point on left side of current extremal point |
| leftRelAmplitude | difference in y-axis position of extremal point on left side of current extremal point |
| rightRelXValue | difference in x-axis position of extremal point on right side of current extremal point |
| rightRelAmplitude | difference in y-axis position of extremal point on right side of current extremal point |

DEVICE AND METHOD FOR DETECTING RADIOGRAPHIC OBJECT USING EXTREMAL DATA

CROSS REFERENCE TO RELATED APPLICATION

The present application claims priority to Korean Patent Application No. 10-2022-0157611, filed on Nov. 22, 2022, the entire contents of which are incorporated herein for all purposes by this reference.

BACKGROUND OF THE INVENTION

1. Field of the Invention

The present disclosure relates to a technique for detecting a radiographic object and, more particularly, to a device and method for detecting a radiographic object using extremal data.

2. Description of the Background Art

Radiography or radiographic testing (RT) is a non-destructive test technique or non-destructive examination (NDE) technique for detecting defects of a radiographic object by utilizing concentration differences on a film caused by differences in the intensity of transmitted radiation when the radiographic object is irradiated.

Radiography uses a manual inspection method to directly locate a tube with an image quality indicator (IQI) penetrometer attached in a macrographic manner to find a weld, i.e., a radiographic object in the tube in order to read a film with an image of multiple tubes. Here, only trained and educated inspectors are able to detect the radiographic object by visually reading the film.

As industry has transitioned to digital imaging using scanners and digital detectors, it is necessary to develop a technology that detects a radiographic object automatically rather than manually.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a device and method for detecting a radiographic object using polarization data.

In an aspect of the present disclosure, there is provided a method of detecting a radiographic object, the method including: receiving, by a feature processing module, an input of radiographic image obtained by irradiating a region containing a plurality of tubes including at least one target tube as a radiographic object and at least one untargeted tube that is not a radiographic object; extracting, by the feature processing module, feature values of extremal points from the radiographic image to detect feature vectors; and analyzing, by a detection module, the feature vectors using a training model to detect a region in the radiographic image where the at least one target tube as a radiographic object exists.

The step of detecting the feature vectors may include: by the feature processing module, extracting row representative values from the radiographic image to create an image row representative graph; extracting extremal points from the image row representative graph; and extracting feature values from the extremal points to generate feature vectors.

The step of creating the image row representative graph may include, by the feature processing module, extracting representative values for a plurality of pixels belonging to the same row through statistical analysis of the plurality of pixels in the radiographic image, and creating the image row representative graph containing the extracted representative values.

The feature values may include a feature of any one extremal point itself from among the extremal points, features of neighboring extremal points of the one extremal point, and a feature of a relationship between the one extremal point and the neighboring extremal points.

The method may further include: prior to receiving the radiographic image, by the feature processing module, receiving a training radiographic image including a region of interest (RoI) that is a region in which a target tube as a radiographic object exists and a region out of the RoI; by the feature processing module, extracting row representative values from the RoI in the radiographic image to create a training image row representative graph; by the feature processing module, extracting training extremal points from the training image row representative graph; by the feature processing module, extracting feature values of the extremal points in the RoI among the extracted extremal points to generate a target group of feature vectors, extracting feature values of the extremal points in the region out of the RoI to generate a control group of feature vectors, and generating training feature vectors including the target group of feature vectors and the control group of feature vectors; and by the training module, allowing a training model to train how to classify the training feature vectors into the target group of feature vectors and the control group of feature vectors.

The training of the training model may include, by the training module, performing an optimization to modify a weighted vector of a decision boundary separating the target group of feature vectors and the control group of feature vectors so that the margin representing the distance from the decision boundary to each of the support vectors of the target group of feature vectors and of the control group of feature vectors is maximized through an objective function of the training model.

The training module may perform the optimization such that the margin is maximized orthogonally to the weighted vector of the decision boundary according to the following equation $$\min_{w,\delta_i} \|w\|^2 + R\sum_{i}^{N} \delta_i$$

where w represents the weighted vector, $\delta_i$ is the tolerance, R is the regularization parameter, i is the index of the training feature vector, and N is the number of training feature vectors.

In another aspect of the present disclosure, there is provided a device for detecting a radiographic object, the device including: a feature processing module configured to receive an radiographic image obtained by irradiating a region containing a plurality of tubes including at least one target tube as a radiographic object and at least one untargeted tube that is not a radiographic object to extract feature values of extremal points from the radiographic image to detect feature vectors; and a detection module configured to analyze the feature vectors using a training model to detect a region in the radiographic image where the at least one target tube as a radiographic object exists.

The feature processing module may be configured to: extract row representative values from the radiographic image to create an image row representative graph; extract extremal points from the image row representative graph; and extract feature values from the extremal points to generate feature vectors.

The feature processing module may be configured to extract representative values for a plurality of pixels belonging to the same row through statistical analysis of the plurality of pixels in the radiographic image, and create the image row representative graph containing the extracted representative values.

The feature values may include a feature of any one extremal point itself from among the extremal points, features of neighboring extremal points of the one extremal point, and a feature of a relationship between the one extremal point and the neighboring extremal points.

The feature processing module may be configured to: receive a training radiographic image including a region of interest (RoI) that is a region in which a target tube as a radiographic object exists and a region out of the RoI; extract row representative values from the RoI in the radiographic image to create a training image row representative graph; extract training extremal points from the training image row representative graph; extract feature values of the extremal points in the RoI among the extracted extremal points to generate a target group of feature vectors; extract feature values of the extremal points in the region out of the RoI to generate a control group of feature vectors; and generate a training feature vectors including the target group of feature vectors and the control group of feature vectors.

The device may further include a training module configured to allow a training model to train how to classify the training feature vectors into the target group of feature vectors and the control group of feature vectors.

The training module may perform an optimization to modify a weighted vector of a decision boundary separating the target group of feature vectors and the control group of feature vectors so that the margin representing the distance from the decision boundary to each of support vectors of the target group of feature vectors and of the control group of feature vectors is maximized through an objective function of the training model.

The training module may perform the optimization such that the margin is maximized orthogonally to the weighted vector of the decision boundary according to the following equation $$\min_{w,\delta_i} \|w\|^2 + R\sum_{i}^{N}\delta_i$$

where w represents the weighted vector, $\delta_i$ is the tolerance, R is the regularization parameter, i is the index of the training feature vector, and N is the number of training feature vectors.

According to the present disclosure, the radiographic inspection automated evaluation solution applied with the training model (machine training/deep training) algorithm can detect the radiographic object by using statistical techniques. In particular, by using statistical techniques to detect radiographic objects, the time to detect radiographic objects can be effectively reduced so that the overall non-destructive testing speed can be improved and high accuracy can be achieved. Thus, the nondestructive testing process can be improved.

BRIEF DESCRIPTION OF THE DRAWINGS

FIG. 1 is a diagram illustrating the configuration of a device for detecting a radiographic object using extremal data according to an embodiment of the present disclosure;

FIGS. 3A, 3B, 3C are drawings illustrating a radiographic image for detecting a radiographic object according to an embodiment of the present disclosure;

FIG. 4 is a diagram illustrating a feature value for detecting a radiographic object according to an embodiment of the present disclosure;

DETAILED DESCRIPTION OF THE INVENTION

Hereinafter, exemplary embodiments of the present disclosure will be described in detail with reference to the accompanying drawings. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term “comprising” or “including” specifies the presence of stated features, numbers, steps, operations, elements, parts, or combinations thereof, but does not preclude the presence or addition of one or more other features, numbers, steps, operations, elements, parts, or combinations thereof.

Figure 1:
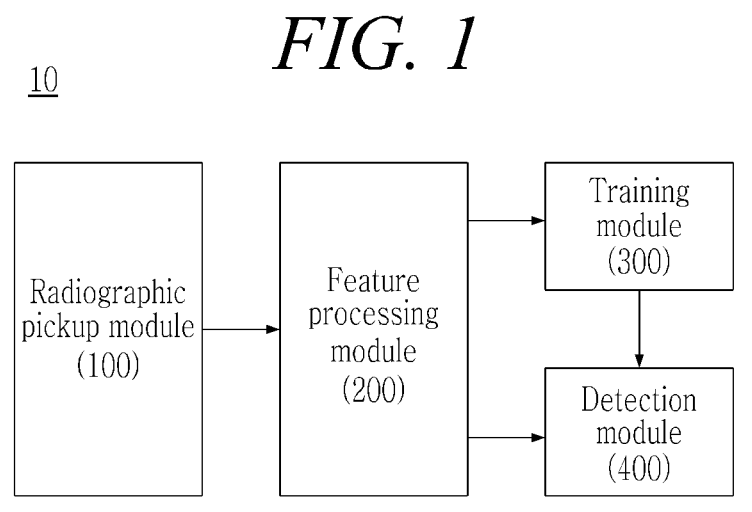
Figure 2A:
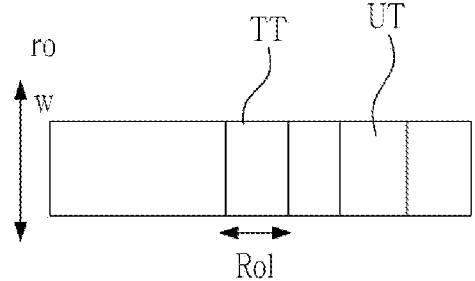
FIGS. 2A, 2B, 2C are diagrams illustrating training data (e.g., a training radiographic image) for training a training model according to an embodiment of the present disclosure.
Figure 2B:
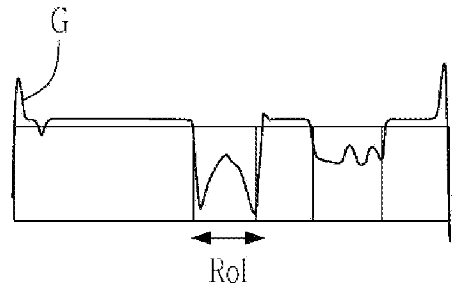
Figure 2C:
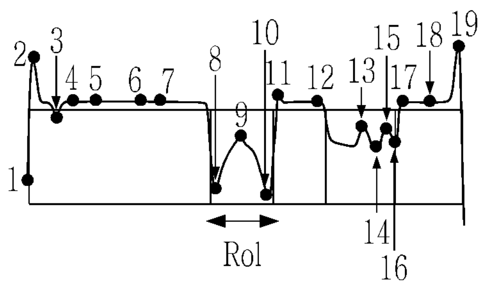

First, a device for detecting a radiographic object using extremal data according to an embodiment of the present disclosure will be described. FIG. 1 is a diagram illustrating the configuration of a device for detecting a radiographic object using extremal data according to an embodiment of the present disclosure, FIGS. 2A-2C are diagrams illustrating training data (e.g., a training radiographic image) for training a training model according to an embodiment of the present disclosure, FIGS. 3A-3C are drawings illustrating a radiographic image for detecting a radiographic object according to an embodiment of the present disclosure, and FIG. 4 is a diagram illustrating a feature value for detecting a radiographic object according to an embodiment of the present disclosure.

Referring to FIG. 1, a device 10 (hereinafter referred to as a detection device) for detecting a radiographic object using extremal data according to an embodiment of the present disclosure is provided to detect a target tube as a radiographic object among a plurality of tubes. The tube throughout this application may be a component of a machine or a plant. For example, the tube may be any tube used in a steam turbine. Also, the tube may be a tube in a reformer such as a catalyst tube or connection tube. Further still, the tube may be one in a heat recovery boiler such as a connection tube, or a tube sheet.

Such a detection device 10 includes a radiographic pickup module 100, a feature processing module 200, a training module 300, and a detection module 400.

The radiographic pickup module 100 is provided for picking-up a radiographic image by irradiating a region in which a plurality of tubes is mixed. An image quality indicator (IQI) penetrometer is attached to one or more particular tubes among the plurality of tubes. The particular tube to which the IQI penetrometer is attached to is referred to as a radiographic target tube or a target tube (TT). The radiographic pickup module 100 produces a radiographic image or a training radiographic image by irradiating a region where a tube with a penetrometer and a tube without a penetrometer are mixed, and then photographing the irradiated region. While the radiographic pickup module 100 may belong to and may be a part of the detection device 10, the radiographic pickup module 100 may be configured as a stand-alone device separate from the detection device 10, according to an embodiment.

The feature processing module 200 receives a training radiographic image or a radiographic image from the radiographic pickup module 100 and detects features from the training radiographic image or radiographic image.

The feature processing module 200 may receive a training radiographic image from the radiographic pickup module 100. Referring to FIG. 2A, the training radiographic image is obtained by irradiating a region in which a plurality of tubes is mixed, while at least one tube of from the plurality of tubes is attached with the IQI penetrometer. The training radiographic image includes a region of interest (RoI), which encompasses the area containing the target tube (TT), the radiographic object, and an area outside of the RoI. The region out of the RoI may include one or more untargeted tubes (UTs) that are not radiographic objects. The feature processing module 200 extracts row representative values from the training radiographic image to create a training image row representative graph G as illustrated in FIG. 2B. Then, the feature processing module 200 extracts one or more training extremal points from the training image row representative graph G, for example, training extremal points 1 to 19 as illustrated in FIG. 2C. Then, the feature processing module 200 extracts feature values from the extracted training extremal points (e.g., training extremal points 1 to 19) and generates training feature vectors based on the feature values.

Then, the feature values of the extremal points in the RoI (e.g., the extremal points 8, 9, and 10 in FIG. 2C) are extracted to generate a target group of feature vectors, and the feature values of the extremal points in the area outside of the RoI (e.g., the extremal points 1 to 7 and 11 to 19 in FIG. 2C) are extracted to generate a control group of feature vectors. The extremal points in the RoI may be referred to as RoI extremal points and the extremal points in the area outside of the RoI may be referred to as non-RoI extremal points.

Referring to FIG. 2C and FIG. 4, according to an embodiment, the feature values of the RoI extremal points may include a feature of any one extremal point (e.g., a RoI reference extremal point 9) from among the training extremal points, features of neighboring training extremal points (e.g., 8, 10) neighboring the RoI reference extremal point (e.g., 9), and features of the relationship between the RoI reference extremal point (e.g., 9) and the neighboring extremal points (e.g., 8, 10). The target group of feature vectors are generated based on such features of the RoI extremal points.

Similarly, according to an embodiment, the feature values of the non-RoI extremal points may include a feature of any one extremal point (e.g., a non-RoI reference extremal point 14) from among the training extremal points, features of neighboring training extremal points (e.g., 13, 15) neighboring the non-RoI reference extremal point (e.g., 14), and features of the relationship between the non-RoI reference extremal point (e.g., 14) and the neighboring extremal points (e.g., 13, 15). The control group of feature vectors are generated based on such features of the non-RoI extremal points.

According to an embodiment, the IQI penetrometer attached to the target tube may cause to generate unique letters in the RoI (i.e., the region corresponding to the target tube) of the training radiographic images. The RoI extremal points and the features of the RoI extremal points may be generated based on the unique letters in the RoI.

The training feature vectors include such target group of feature vectors and such control group of feature vectors, and the training feature vectors are provided to the training module 300. The training module 300 provides and trains a training model to distinguish the target group of feature vectors and the control group of feature vectors and to classify feature vector into either the target group of feature vectors or the control group of feature vectors, using the received target group of feature vectors and control group of feature vectors.

Meanwhile, the feature processing module 200 may receive an input of radiographic image acquired for non-destructive testing. An example of such an image is illustrated in FIG. 3A. Referring to FIG. 3A, the plurality of tubes includes one or more target tubes (TTs) and one or more untargeted tubes (UTs). The one or more target tubes (TTs) are the ones to which the IQI penetrometer is attached and thus are radiographic objects. On the other hand, the one or more untargeted tubes (UTs) are the ones to which the IQI penetrometer is not attached and thus are not radiographic objects. When a radiographic image is input, the feature processing module 200 extracts row representative values from the input radiographic image to create an image row representative graph G as illustrated in FIG. 3B. The feature processing module 200 then extracts a plurality of extremal points, for example, extremal points 1 to 19, as illustrated in FIG. 3C, from the image row representative graph G. Then, the feature processing module 200 extracts feature values for the extracted extremal points (e.g., extremal points 1 to 19) and generate a plurality of feature vectors based on the feature values.

Referring to FIG. 3C and FIG. 4, the feature values include a feature of any one extremal point (e.g., the reference extremal point 9) from among the extremal points, features of neighboring extremal points (e.g., 8, 10) neighboring the reference extremal point (e.g., 9), and features of the relationship between the reference extremal point (e.g., 9) and the neighboring extremal points (e.g., 8, 10). These feature vectors are provided to the detection module 400.

The training module 300 is provided to generate a training model according to an embodiment of the present disclosure. The training model may be a support vector machine (SVM) model, such as one class SVM (OC-SVM), support vector data description (SVDD), or the like. The training module 300 allows the training model to train how to classify training feature vectors into a target group of feature vectors and a control group of feature vectors.

The detection module 400 is provided to detect a region in the radiographic image in which a target tube (TT) that is a radiographic object exists. In other words, the detection module 400 automatically determines which region in the radiographic image indicates and corresponds to the target tube (TT). To this end, when feature vectors are input from the feature processing module 200, the detection module 400 classifies the input feature vectors into a target group of feature vectors and a control group of feature vectors by using a training model trained by the training module 300, and detects a region in the radiographic image that corresponds to the target group of feature vectors as a region in which a target tube (TT) as a radiographic object exists.

Figure 5:
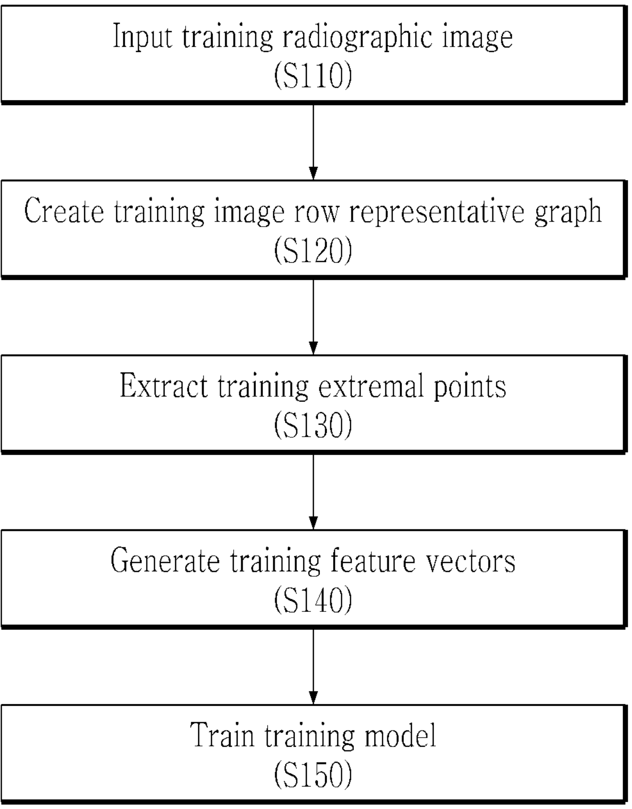
FIG. 5 is a flow diagram illustrating a method of generating a training model according to an embodiment of the present disclosure.

A method of generating a training model according to an embodiment of the present disclosure will now be described by referring to FIG. 5. FIG. 5 is a flow diagram illustrating the method of generating a training model and training the training model according to the embodiment of the present disclosure.

Referring to FIG. 5, the feature processing module 200 receives a training radiographic image in step S110. Referring to FIG. 2A, the training radiographic image is obtained by irradiating a region in which a plurality of tubes is mixed. The training radiographic image includes a region of interest (RoI), which is a region in which a target tube (TT) that is a radiographic object exists, and a region out of the RoI. The region out of the RoI may include one or more untargeted tubes (UTs) that are not radiographic objects.

Then, in step S120, the feature processing module 200 extracts row representative values from the training radiographic image to create a training image row representative graph G as illustrated in FIG. 2B.

Specifically, for example, the feature processing module 200 extracts representative values for a plurality of pixels belonging to the same row through a statistical analysis for the plurality of pixels in the radiographic image, and creates a training image row representative graph G including the extracted representative values. For example, the statistical analysis may be a time-domain or frequency-domain standard deviation, the mean, or the like for the pixel values.

Then, in step S130, the feature processing module 200 extracts one or more training extremal points, for example, extremal points 1 to 19, as illustrated in FIG. 2C, from the training image row representative graph G. For example, the feature processing module 200 may extract the training extremal points using Scipy package Argrelextrema.

Then, in step S140, the feature processing module 200 then extracts feature values from the extracted training extremal points (e.g., the extracted training extremal points 1 to 19) to generate training feature vectors. Specifically, the feature values of the extremal points in the RoI (e.g., the extremal points 8, 9, and 10 in FIG. 2) are extracted to generate a target group of feature vectors, and the feature values of the extremal points in the region out of the RoI (e.g., the extremal points 1 to 7 and 11 to 19 in FIG. 2) are extracted to generate a control group of feature vectors.

Referring to FIG. 2C and FIG. 4, the feature values include a feature of any one particular extremal point (e.g., extremal point 9) itself from among the training extremal points, features of neighboring training extremal points (e.g., 8, 10) neighboring the particular training extremal point (e.g., the extremal point 9), and features of the relationship between the particular training extremal point (e.g., the extremal point 9) and the neighboring training extremal points (e.g., extremal points 8, 10). For example, referring to FIG. 4, the feature of any one extremal point (e.g., extremal point 9) itself may be a sign, an x-axis position, a y-axis position, or the like. Further, the features of neighboring training extremal points (e.g., extremal points 8, 10) of the training extremal point (e.g., extremal point 9) may be a sign, an x-axis position, a y-axis position, or the like of the neighboring extremal points (e.g., extremal points 8, 10). In addition, the features of the relationship between the training extremal point (e.g., extremal point 9) and the neighboring training extremal points (e.g., extremal points 8, 10) may be a difference in an x-axis position and a y-axis position between the extremal points (e.g., extremal point 9) and the neighboring extremal points (e.g., extremal points 8, 10).

Next, in step S150, the training module 300 allows the training model to train how to classify training feature vectors into a target group of feature vectors and a control group of feature vectors.

In particular, the training module 300 may perform an optimization to modify a weighted vector of a decision boundary separating the target group of feature vectors and the control group of feature vectors so that the margin representing the distance from the decision boundary to each of support vectors of the target group of feature vectors and of the control group of feature vectors is maximized through an objective function of the training model. Accordingly, the training of the training model is performed. In other words, the training module 300 optimizes the objective function of the training model such that the margin is maximized orthogonally to the weighted vector of the decision boundary, as illustrated in the following Equation 1.

$$\min_{w,\delta_i} \|w\|^2 + R\sum_{i}^{N}\delta_i \qquad \text{Equation 1}$$

where w represents the weighted vector. Hence, the margin is $\|w\|/2$. Also, $\delta_i$ is the tolerance, R is the regularization parameter, which can be predetermined, i is the index of the training feature vector, and N is the number of training feature vectors.

Figure 6:
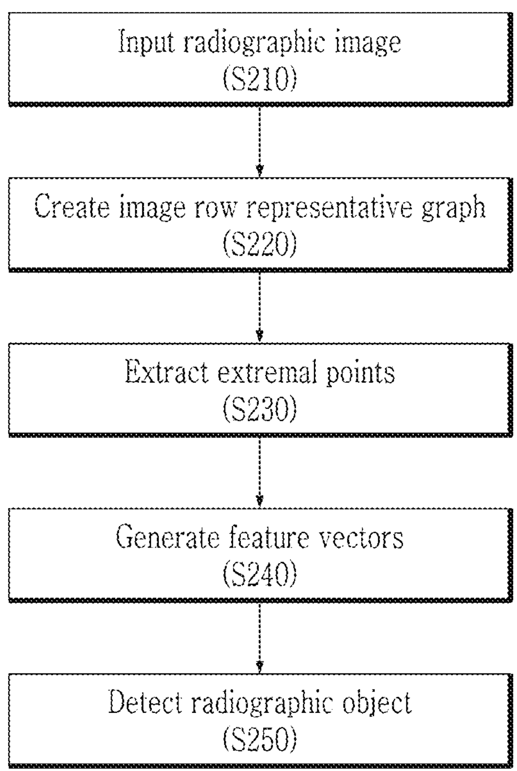
FIG. 6 is a flow diagram illustrating a method of detecting a radiographic object using extremal data according to an embodiment of the present disclosure.

Next, a method of detecting a radiographic object using extremal data according to an embodiment of the present disclosure will be described. FIG. 6 is a flow diagram illustrating a method of detecting a radiographic object using extremal data according to an embodiment of the present disclosure.

Referring to FIG. 6, in step S210, the feature processing module 200 receives an input of radiographic image acquired for non-destructive testing. An example of such an image is illustrated in FIG. 3A. The radiographic image is obtained by irradiating a region in which a plurality of tubes is mixed. Referring to FIG. 3A, the plurality of tubes includes one or more target tubes (TTs) that are radiographic objects and one or more untargeted tubes (UTs) that are not radiographic objects.

After the radiographic image is input, the feature processing module 200, in step S220, extracts row representative values from the input radiographic image to create an image row representative graph G. Such an image row representative graph G is illustrated in FIG. 3B.

At this time, the feature processing module 200 extracts representative values for a plurality of pixels belonging to the same row through a statistical analysis for the plurality of pixels in the radiographic image, and creates an image row representative graph G including the extracted representative values. For example, the statistical analysis may be a time-domain or frequency-domain standard deviation, the mean, or the like for the pixel values.

Then, in step S230, the feature processing module 200 extracts a plurality of extremal points (for example, extremal points 1 to 19), as illustrated in FIG. 3C, from the image row representative graph G. For example, the feature processing module 200 may extract the plurality of extremal points using Scipy package Argrelextrema.

In step S240, the feature processing module 200 then extracts feature values for the extracted extremal points (e.g., extremal points 1 to 19) to generate a plurality of feature vectors. Referring to FIG. 3C and FIG. 4, the feature values include a feature of any one particular extremal point (e.g., the extremal point 9) itself from among the extremal points, features of neighboring extremal points (e.g., extremal points 8, 10) neighboring the particular extremal point (e.g., the extremal point 9), and features of the relationship between the particular extremal point (e.g., the extremal point 9) and the neighboring extremal points (e.g., the extremal points 8, 10).

Referring to FIG. 4, the feature of any one particular extremal point (e.g., the extremal point 9) itself may be a sign, an x-axis position, a y-axis position, or the like. Further, the features of neighboring training extremal points (e.g., the extremal points 8, 10) of the training extremal point (e.g., the extremal point 9) may be a sign, an x-axis position, a y-axis position, or the like of the neighboring extremal points (e.g., the extremal points 8, 10). In addition, the features of the relationship between the training extremal point (e.g., the extremal point 9) and the neighboring training extremal points (e.g., the extremal points 8, 10) may be a difference in an x-axis position and a y-axis position between the extremal points (e.g., the extremal point 9) and the neighboring extremal points (e.g., the extremal points 8, 10).

Next, in step S250, the detection module 400 classifies the feature vectors into a target group of feature vectors or a control group of feature vectors using the training model trained in step S150, and detects the region in the radiographic image that corresponds to the target group of feature vectors as a region in which a target tube (TT) as a radiographic object exists.

According to the present disclosure, the process from S210 to S250 may be performed automatically by the detection device 10 using a training model trained based on extremal points in the multiple radiographic images. In other words, according to the present disclosure, the detection device 10, based on AI (artificial intelligence) techniques, automatically, more efficiently, in a faster manner, and more accurately detects which one of a plurality of tubes is the one to which the IQI penetrometer is attached. Specifically, a training model is trained based on extremal points contained in multiple radiographic images generated by irradiating a region in which a plurality of tubes are mixed. And the detection device 10 automatically detects which one of the plurality of tubes is the one to which the IQI penetrometer is attached by using the trained training model. The unique manner of training and the unique manner of detection are as described above.

By detecting the target tube (the tube to which the IQI penetrometer is attached) in a more efficient, faster, and more accurate manner, the time that is to be spent for the whole process of examining multiple tubes may be shortened. Also, any tube that has a defect, from among the plurality of tubes, may be discovered in a faster and more efficient manner.

Figure 7:
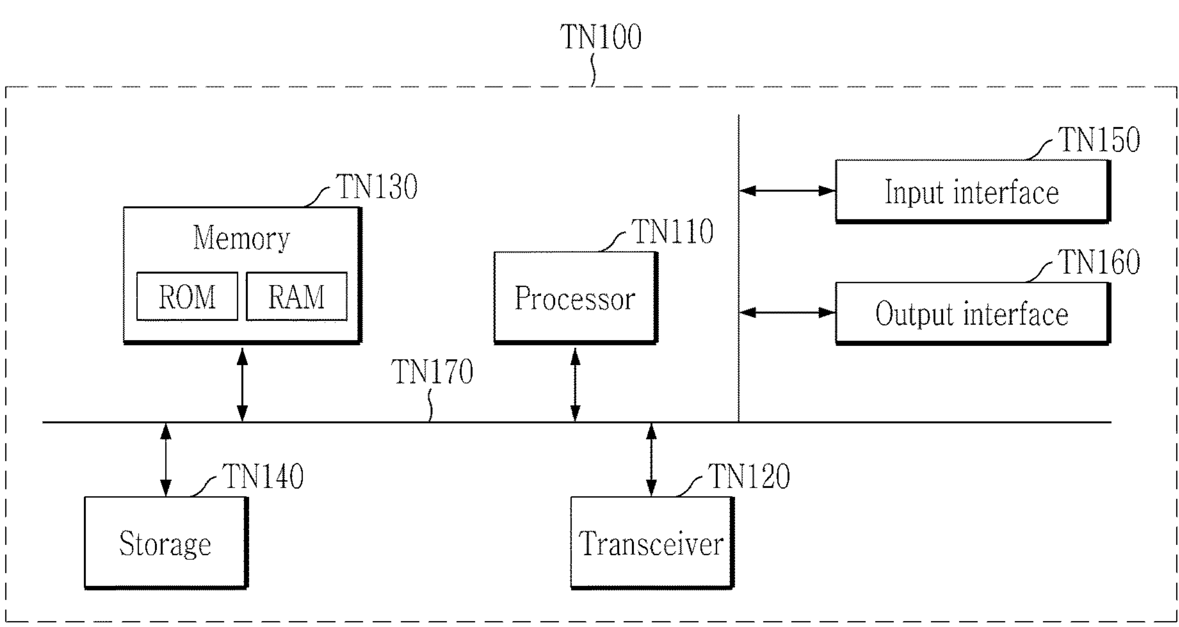
FIG. 7 is a diagram illustrating a computing device according to an embodiment of the present disclosure.

FIG. 7 is a diagram illustrating a computing device according to an embodiment of the present disclosure. The computing device TN100 of FIG. 7 may be the device described herein (e.g., detection device 10, etc.).

In the embodiment of FIG. 7, the computing device TN100 may include at least one processor TN110, a transceiver TN120, and a memory TN130. The computing device TN100 may further include a storage TN140, an input interface TN150, an output interface TN160, and the like. The components included in the computing device TN100 may be connected by a bus TN170 to communicate with each other.

The processor TN110 may execute program instructions stored in at least one of the memory TN130 and the storage TN140. The processor TN110 may refer to a central processing unit (CPU), a graphic processing unit (GPU), or a dedicated processor on which the method according to embodiments of the present disclosure is performed. The processor TN110 may be configured to implement the procedures, functions, and methods described in connection with embodiments of the present disclosure. The processor TN110 may control respective components of the computing device TN100.

The memory TN130 and the storage TN140 may each store various pieces of information related to the operation of the processor TN110. The memory TN130 and the storage TN140 may each be configured as at least one of a volatile storage medium and a non-volatile storage medium. For example, the memory TN130 may be configured as at least one of a read only memory (ROM) and a random access memory (RAM).

The transceiver TN120 may transmit or receive a wired signal or a wireless signal. The transceiver TN120 may be connected to a network to perform communication.

On the other hand, various methods according to the above-mentioned embodiments of the present disclosure may be implemented in the form of a program or program modules readable through various computer means and recorded on a computer-readable recording medium. Here, the recording medium may include program instructions, data files, data structures, and the like alone or in combination. The program instructions recorded on the recording medium may be specifically designed and configured for the present disclosure or may be known and available to those skilled in the art of computer software. For example, the recording medium may include magnetic media such as hard disks, floppy disks, and magnetic tapes; optical media such as CD-ROMs and DVDs; magneto-optical media such as floptical disks; and hardware devices specifically configured to store and perform program instructions, such as ROM, RAM, flash memory, and the like. Examples of program instructions may include machine language such as language produced by a compiler, as well as high-level language wires that may be executed by a computer using an interpreter or the like. Such hardware devices may be configured to operate as one or more software modules to perform the operations of the present disclosure, and vice versa.

Still, according to embodiments, the radiographic pickup module 100, the feature processing module 200, the training module 300, and the detection module 400 may be implemented as hardware circuitries or software modules, or software/hardware combined circuitries.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure. Similarly, it is understood that the present disclosure encompasses any embodiment that combines features of one embodiment and features of another embodiment.

The invention claimed is:

1. A method of detecting a radiographic object, performed by at least one processor executing a program stored in a memory, the method comprising: receiving a radiographic image obtained by irradiating a region containing a plurality of tubes including at least one target tube as a radiographic object and at least one untargeted tube that is not a radiographic object; extracting feature values of extremal points from the radiographic image to detect feature vectors; and analyzing the feature vectors using a training model to detect a region in the radiographic image where the at least one target tube as a radiographic object exists, wherein, prior to receiving the radiographic image, performing a training operation for training the training model, the training operation comprises: receiving a training radiographic image including a region of interest (RoI) that is a region in which a target tube as a radiographic object exists and a region out of the RoI, extracting row representative values from the RoI in the radiographic image to create a training image row representative graph, and training the training model based on the training image row representative graph, wherein the training operation further comprises: extracting training extremal points from the training image row representative graph; extracting feature values of the extremal points in the RoI among the extracted extremal points to generate a target group of feature vectors; extracting feature values of the extremal points in the region out of the RoI to generate a control group of feature vectors, and generating training feature vectors including the target group of feature vectors and the control group of feature vectors; and training the training model to perform a classification operation classifying the training feature vectors into the target group of feature vectors and the control group of feature vectors, performing an optimization to modify a weighted vector of a decision boundary separating the target group of feature vectors and the control group of feature vectors so that a margin representing the distance from the decision boundary to each of the support vectors of the target group of feature vectors and of the control group of feature vectors is maximized through an objective function of the training model wherein the training model is configured to perform the optimization that the margin is maximized orthogonally to the weighted vector of the decision boundary according to the following equation:

$$\min_{w,\delta_i} \|w\|^2 + R\sum_{i}^{N}\delta_i$$

where w represents the weighted vector, is the tolerance, R is the regularization parameter, i is the index of the training feature vector, and N is the number of training feature vectors.

2. The method according to claim 1, wherein detecting the feature vectors comprises:

extracting row representative values from the radiographic image to create an image row representative graph;

extracting extremal points from the image row representative graph; and extracting feature values from the extremal points to generate feature vectors.

3. The method according to claim 2, wherein creating the image row representative graph comprises:

extracting representative values for a plurality of pixels belonging to the same row through statistical analysis of the plurality of pixels in the radiographic image, and creating the image row representative graph containing the extracted representative values.

4. The method according to claim 2, wherein the feature values include a feature of any one extremal point from among the extremal points, features of neighboring extremal points of the one extremal point, and a feature of a relationship between the one extremal point and the neighboring extremal points.

5. A device for detecting a radiographic object, the device comprising: a memory storing a program; and at least one processor configured to perform, when executing the program: receiving a radiographic image obtained by irradiating a region containing a plurality of tubes including at least one target tube as a radiographic object and at least one untargeted tube that's not a radiographic object; extracting feature values of extremal points from the radiographic image to detect feature vectors; and analyzing the feature vectors using a training model to detect a region in the radiographic image where the at least one target tube as a radiographic object exists, wherein, prior to receiving the radiographic image, the at least one processor performs a training operation for training the training model, the training operation comprises: receiving a training radiographic image including a region of interest (RoI) that is a region which a target tube as a radiographic object exists and a region out of the RoI, extracting row representative values from the RoI in the radiographic image to create a training image row representative graph, and training the training model based on the training image row representative graph, wherein the training operation further comprises: extracting training extremal points from the training image row representative graph; extracting feature values of the extremal points in the RoI among the extracted extremal points to generate a target group of feature vectors; extracting feature values of the extremal points in the region out of the RoI to generate a control group of feature vectors, and generating training feature vectors including the target group of feature vectors and the control group of feature vectors; and training the training model to perform a classification operation classifying the training feature vectors into the target group of feature vectors and the control group of feature vectors, performing an optimization to modify a weighted vector of a decision boundary separating the target group of feature vectors and the control group of feature vectors so that a margin representing the distance from the decision boundary to each of the support vectors of the target group of feature vectors and of the control group of feature vectors is maximized through an objective function of the training model wherein the training model is configured to perform the optimization that the margin is maximized orthogonally to the weighted vector of the decision boundary according to the following equation:

$$\min_{w,\delta_i} \|w\|^2 + R\sum_{i}^{N} \delta_i$$

where w represents the weighted vector, is the tolerance, R is the regularization parameter, i is the index of the training feature vector, and N is the number of training feature vectors.

6. The device according to claim 5, wherein detecting the feature vectors comprises:

extracting row representative values from the radiographic image to create an image row representative graph;

extracting extremal points from the image row representative graph; and extracting feature values from the extremal points to generate feature vectors.

7. The device according to claim 6, wherein creating the image row representative graph comprises:

extracting representative values for a plurality of pixels belonging to the same row through statistical analysis of the plurality of pixels in the radiographic image, and creating the image row representative graph containing the extracted representative values.

8. The device according to claim 6, wherein the feature values include a feature of any one extremal point from among the extremal points, features of neighboring extremal points of the one extremal point, and a feature of a relationship between the one extremal point and the neighboring extremal points.

* * * * *